3,114,625
PREVENTING REVERSION BY THE ADDITION OF NITRO-HUMIC ACID OR ALKALI SALTS THEREOF
Kozo Higuchi, Kita-ku, Tokyo, and Michio Tsuyuguchi, Tetsuro Osa, Koji Ando, and Setsuko Yonemoto, Tokyo, Japan, assignors to Hokkaido Tanko Kisen Kabushiki Kaisha, Tokyo, Japan, a corporation of Japan
No Drawing. Filed Mar. 7, 1960, Ser. No. 12,915
Claims priority, application Japan Mar. 6, 1959
2 Claims. (Cl. 71—64)

This invention relates to a novel phosphate fertilizer composition and the method of manufacture thereof. More particularly the invention relates to a method of manufacturing a novel phosphate fertilizer which comprises mixing nitro-humic acids and their alkali salts with phosphates such as calcium superphosphate, double superphosphate, ammonium phosphate, fused phosphate fertilizer, burnt phosphate fertilizer, Thomas slag, powdered rock phosphate, and the like.

An object of this invention is to provide a phosphate fertilizer composition possessing enhanced effectiveness and the method of manufacture thereof.

Another object of the invention is to provide a method of preventing the loss of the available phosphoric acid resulting from the insolubilization in the soil of the available phosphoric acid of water and citric acid soluble phosphates.

A further object of the invention is the provision of a method for converting phosphates that are insoluble in water or citric acid gradually into water or citric acid soluble phosphates.

A still further object of the invention is to provide a method of caking and molding phosphates.

Still other objects will become apparent from the description to be given hereinafter.

As phosphate fertilizers there have been used phosphates of various kinds such as calcium superphosphate, double superphosphate, ammonium phosphate, fused phosphate fertilizer, burnt phosphate fertilizer, Thomas slag, and guano rock phosphate. And it is also already known that the phosphates such as described above, which may be used directly as phosphate fertilizers, must be in all cases in a water soluble or citric acid soluble state. However, when these water or citric acid soluble phosphates are actually used as fertilizers, a greater part of these water and citric acid soluble phosphates uniting with the iron, alumina, etc. present in the soil becomes converted into a state where they cannot be absorbed by plants, i.e., phosphates that are insoluble in water or citric acid. As a result, it is known that the available phosphoric acid that is actually absorbed into the plants from the water and citric acid soluble phosphates used amounts to a very small amount.

As methods by which most of the aforementioned water soluble or citric acid soluble phosphates are manufactured, there are known either a method of causing powdered rock phosphates to be acted on by mineral acids such as sulfuric acid, phosphoric acid, etc., a method of fusing powdered rock phosphates at high temperatures, or a method of sintering powdered rock phosphates at high temperatures after addition of other inorganic salts, for example, Glauber's salt. However, in accordance with these conventional methods, in order to obtain water or citric acid soluble phosphates, in all cases there is the disadvantage that it is necessary either that chemicals which are highly corrosive to the manufacturing vessels such as mineral acids be used or that high temperatures of over 1000° C. be used.

As a result of our studies concerning the various properties of nitro-humic acids over a long period of years, we found however that nitro-humic acids or their alkali salts acted as a sort of a reaction medium with respect to those phosphates that are insoluble in water or citric acid to gradually convert such phosphates into those that are soluble in water or citric acid. What we found was that by merely mixing and contacting one or two more compounds selected from the group consisting of nitro-humic acids and their alkali salts with those phosphates that are substantially insoluble in water or citric acid such as, for example, ferric phosphate, aluminum phosphate, calcium orthophosphate, and the double salt of calcium orthophosphate-calcium halides, the aforesaid phosphates were gradually converted into a form of phosphate either soluble or readily soluble in water or citric acid.

In accordance with our studies, it is believed that the conversion to water or citric acid soluble phosphates, as above described, is due to a reaction mechanism as described below.

According to our studies, as a typical example, nitro-humic acids have the composition $$C_{49}H_{44}O_{10}(-COOH)_5(-OH)_6(CO)_4(-NO_2)_3(-NOH)$$

where —OH represents a phenol type OH (Journal of Fuel Society of Japan, vol. 34, p. 645, 1955), and it is believed that the nucleus structure having the benzol rings as its cluster unit has an arrangement that is close to linear and that the active radicals such as the carboxyl and hydroxyl radicals are distributed almost equally to each of the ring structures (Journal of Fuel Society of Japan, vol. 33, p. 373, 1954).

When phosphates that are insoluble in water or citric acid are brought in contact with nitro-humic acids having this type of structure, the insoluble phosphates being decomposed by the phenol radical which has been activated by the carboxyl radical or nitro radical forms free phosphoric acid by which the phosphates insoluble in water or citric acid are decomposed and changed to those that are water or citric acid soluble. Further, while it is conceivable that a part of the free phosphates formed, as above forms phosphoric esters with hydroxyl radicals or causes a weak ionic bonding with nitrogen-containing radicals, these bonds being relatively weak, it is believed that if the ambient pH value is made to be somewhat acidic, for example, equivalent to about the acidity of citric acid, hydrolysis occurs readily whereby phosphoric acid in a free state is again formed and passes into the liquid, and by this the reaction of converting the water or citric acid insoluble phosphate into those that are soluble is repeated. In bringing about this reaction the fact that nitro-humic acids form with the alkali earth metals, trivalent metals, etc. salts that are very hard to dissolve in water may also be a cause as to make the various above-described reactions proceed smoothly. However, the solubility of these salts are also far greater than the solubility of the salts formed between the above metallic ions and aliphatic polycarboxylic acid secreted by plant life, and on account of the acidity of aliphatic polycarboxylic acid being considerably higher than that of nitro-humic acids, the double decomposition between the metallic salts of nitro-humic acids and aliphatic polycarboxylic acid is easily promoted, the conversion rate of insoluble phosphates into water or citric acid soluble phosphates by means of the action of nitro-humic acids attaining a considerably large figure.

However, inasmuch as this conversion reaction being a reaction between solid phases, it is believed that it proceeds gradually, a slight amount of time being required. Also, when the alkali salts such as the ammonium, potassium, and the like salts of nitro-humic acids are used, if the ambient liquid is made acidic to a slight degree, not only does a completely identical reaction as in the case of nitro-humic acids occur but this also becomes a buffering agent as to create a state very favorable for the reaction.

Thus in accordance with this invention, by merely mixing the phosphates that are substantially insoluble in water or citric acid as described hereinabove and leaving them in a state of contact with one or two or more of those compounds selected from the group consisting of nitro-humic acids and the alkali salts thereof, the phosphates that are insoluble in water or citric acid are gradually converted into a form that is soluble in water or citric acid by the presence of the moisture in the atmosphere. Moreover, once this conversion reaction commences, as a result of the state of equilibrium collapsing, the formation of phosphates soluble in water or citric acid gradually proceeds for an infinite period.

Furthermore, with phosphates that are soluble in water or citric acid being ipso facto a phosphate fertilizer, and moreover with not only nitro-humic acids and their alkali salts being already known as a very suitable improver of clay soils (Journal of Fuel Society of Japan, vol. 35, p. 640, 1956), but also for the reason that the reaction by the method of the present invention being an ion-exchange reaction by means of substances which are not only harmless but also are effective for the soils, in accordance with this invention a retardative acting phosphate fertilizer is provided by a very simple and easy operation without the need as heretofore of a tremendous amount of energy such as for high temperature fusion or chemicals that are corrosive with respect to metals. In addition, in manufacturing the phosphate fertilizer obtainable by the present invention, since by repeating the above reaction, the water or citric acid soluble phosphates can be formed gradually with remarkable efficiency, it is believed that their value as a phosphate fertilizer will far exceed those produced by the conventional method.

As the alkali salts of nitro-humic acids used in this invention there can be cited, for example, the salts of such as ammonium, sodium, potassium, etc. of nitro-humic acids.

Additionally, inasmuch as the nitro-humic acids or the alkali salts of nitro-humic acids used in this invention, as can be conceivable from the aforesaid reaction mechanism, act as a kind of a reaction medium in the reaction to convert phosphates that are insoluble in water or citric acid into citric acid soluble phosphates, when the conversion into citric acid soluble phosphates is considered as the main objective, it suffices that the quantity added be a very small amount. On the other hand, when the quantity added is large, it is believed its effectiveness as a soil conditioner is also manifested concurrently.

Further, in accordance with our studies, we were able to ascertain that nitro-humic acids and their alkali salts, as above described, effected a relatively weak bond with water soluble and citric acid soluble phosphates also. It is obvious that these properties possessed by nitro-humic acids or their alkali salts are very effective in preventing the water soluble and citric acid soluble phosphates from becoming fixed in an insoluble state as to be not capable of being absorbed by plants on account of the aforesaid phosphates forming a bond with the iron, alumina, etc. present in the soil. This action of nitro-humic acids or their alkali salts is due to the fact that a reverse reaction to the reaction as has already been described regarding the action of nitro-humic acids and their alkali salts with respect to phosphates that are insoluble in water or citric acid is carried out on account of the various activating radicals possessed by nitro-humic acids and their alkali salts.

Furthermore, according to our studies (refer to the Journal of Fuel Society of Japan, 1956, vol. 35, p. 640), we found that when nitro-humic acids or ammonium nitro-humate was added to a soil having a high phosphoric acid absorption index, the nitro-humic acids would unite with the iron and alumina in the soil and lower remarkably the soils phosphoric acid absorption index in proportion to the quantity of the nitro-humic acids or their ammonium salts that have been added.

Thus, when nitro-humic acids or their ammonium salts have been added to and mixed with phosphates that are soluble in water or citric acid such as, for example, calcium phosphate, fused phosphate fertilizer, and burnt phosphate fertilizer, or those phosphates that are insoluble in water or citric acid such as rock phosphate, by virtue of the various properties, as described above, possessed by nitro-humic acids or their ammonium salts, the nitro-humic acids or their ammonium salts effectively capture the water soluble or citric acid soluble phosphates, thus preventing the washing away or fixation in the soil. Moreover, with the bond between nitro-humic acids and these water soluble and citric acid soluble phosphates weak to begin with, the absorption by the plants of phosphates is not hampered in any way whatsoever. Further, by converting the insoluble phosphates such as rock phosphate into salts soluble in water or citric acid and repeating the above action, the absorption rate of phosphates by plants can be increased greatly as to bring about remarkably favorable results in the growth of plants.

Furthermore, on account of the fact that a chemical bond occurs, as described hereinabove, between nitro-humic acids or their ammonium salts and the calcium ion in case of rock phosphate or the phosphoric ion in case of the water soluble and citric acid soluble phosphates, when nitro-humic acids or their ammonium salts are mixed with phosphates, they also act as a very good caking agent.

In addition, since the ammonium salts of nitro-humic acids are readily soluble in water, even if only a very small amount of water is present during molding, by permeating well between the particles of the solid phosphates and by having a large contact area, it serves in binding firmly the solid particles. Therefore, nitro-humic acids or their alkali salts become a very good caking agent during the granulation of the phosphates.

In granulating the various kinds of phosphates by using nitro-humic acids or their alkali salts, the phosphates may be either kneaded together with nitro-humic acids or their alkali salts in the presence of a small amount of water, left standing for awhile, and then pulverized, followed by screening, if desired, to obtain grains ranging in sizes suitable for use. Or, the above kneaded mixture may be granulated to optional forms using a suitable tablet machine.

The phosphate fertilizer, which has been thus formed into granular form, by the fact that in its application the area of contact with the soil is less than in case of its application as a powder, not only is the fixation in the soil of the phosphate fertilizer reduced, but also conjointly with the action of the above-described nitro-humic acids in preventing the fixing and insolubilizing of phosphates in the soil, the washing away of the phosphate fertilizer into the soil is almost completely prevented. Consequently, the phosphate fertlizer becomes utilized over a long period of time as a phosphate absorbable by plants. Moreover this type of granular phosphate fertilizer becomes also convenient with respect to its handling, transportation, etc.

In manufacturing the phosphate fertilizer of this invention, it is to be understood that the scope of the invention includes all of the following, i.e., it is possible to add to and mix with the phosphates at the same time nitrogenous fertilizers such as, for example, ammonium sulfate, ammonium nitrate, urea, etc. or potassic fertilizers such as potassium chloride, potassium sulfate, etc.; or it is also possible to add further besides nitro-humic acids or their ammonium salts any other additives that do not impair the spirit of this invention, for example, caking agents such as molasses, starch, etc.

EXAMPLE 1

10 g. of powdered rock phosphate from Florida, U.S.A., were accurately weighed. To this was mixed either nitro-humic acids or their alkali salts in prescribed amounts as shown in Table I, below. After thorough saturation of the above, they were placed and left standing in a constant temperature tank where they were reacted at 20° C. The mixtures which had elapsed 20–80 days were measured for the amount of water and citric acid soluble phosphates formed in accordance with the Japan Fertilizer Standard. The results were as shown in Table I, below.

The analysis of the powdered rock phosphate used indicate the following: loss on ignition—7.90%, $P_2O_5$—31.18%, CaO—44.89%, $SiO_2$—8.25%, F—3.85%, and $R_2O_3$—1.97%.

TABLE I

| Amount of nitro-humic acids added (percent by wt. to rock phosphate) | Days elapsed | Phosphate water solubilization rate (percent) | Phosphate citric acid solubilization rate (percent) | Phosphate water solubilization rate + citric acid solubilization rate (percent) |
|---|---|---|---|---|
| 5 | 20 | 0.95 | 23.8 | 24.75 |
| 5 | 40 | 0.27 | 19.8 | 20.07 |
| 5 | 80 | (¹) | ² 22.00 | 22.0 |
| 25 | 20 | 1.0 | 23.8 | 24.8 |
| 25 | 40 | 0.67 | 19.5 | 20.17 |
| 50 | 20 | 1.25 | 23.8 | 25.05 |
| 50 | 40 | 0.94 | 19.2 | 20.14 |
| 100 | 20 | 1.73 | 18.0 | 19.73 |
| 100 | 40 | 2.67 | 19.1 | 21.77 |
| 200 | 20 | 1.35 | 18.6 | 19.95 |
| 200 | 40 | 2.07 | 23.5 | 25.57 |
| 500 | 20 | 1.93 | 17.8 | 19.73 |
| 500 | 40 | 7.94 | 21.3 | 29.34 |
| 5 (Ammonium salts) | 20 | 0.60 | 21.8 | 22.40 |
| 5 (Ammonium salts) | 80 | 2.11 | 29.5 | 31.6 |
| 50 (Ammonium salts) | 20 | 0.54 | 28.8 | 29.3 |
| 100 (Ammonium salts) | 20 | 0.63 | 30.0 | 30.6 |
| 100 (Ammonium salts) | 80 | 0.19 | 30.0 | 30.19 |
| 83.5 (Sodium salt) | 20 | 0.59 | 30.0 | 30.59 |
| 92.9 (Potassium salt) | 20 | 3.11 | 29.8 | 32.9 |

¹ Not measured.
² Water + citric acid solubility.

EXAMPLE 2

An operation similar to that of Example 1 was carried out, except that 10 g. of aluminum phosphate ($AlPO_4$) was used in lieu of the powdered rock phosphate, and the state of conversion into water soluble and citric acid soluble phosphate was studied. The results obtained are shown in Table II, below.

TABLE II

| Aluminum phosphate (g.) | Nitro-humic acids added (g.) | Days heated | Proportion of dissolved $P_2O_5$ to total $P_2O_5$ of sample | | |
|---|---|---|---|---|---|
| | | | Water soluble $P_2O_5$ (percent) | Citric acid soluble $P_2O_5$ (percent) | Soluble $P_2O_5$ (percent) |
| 10.0 | 0.5 | 20 | 1.45 | 1.61 | 3.06 |
| 10.0 | 2.5 | 20 | 1.06 | 1.55 | 2.61 |
| 10.0 | 5.0 | 20 | 0.76 | 1.73 | 2.49 |
| 10.0 | 10.0 | 20 | 1.00 | 1.42 | 2.42 |
| 10.0 | 20.0 | 20 | 1.44 | 2.26 | 3.70 |
| 10.0 | 50.0 | 20 | 2.23 | 5.77 | 8.00 |
| 10.0 | 0.5 | 40 | 1.48 | 1.81 | 3.29 |
| 10.0 | 2.5 | 40 | 1.06 | 1.68 | 2.74 |
| 10.0 | 5.0 | 40 | 0.71 | 1.68 | 2.39 |
| 10.0 | 10.0 | 40 | 0.74 | 1.81 | 2.55 |
| 10.0 | 20.0 | 40 | 0.69 | 2.19 | 2.88 |
| 10.0 | 50.0 | 40 | 1.83 | 3.35 | 5.18 |
| 10.0 | 0.5 | 80 | 1.48 | 1.03 | 2.51 |
| 10.0 | 2.5 | 80 | 1.02 | 0.90 | 1.92 |
| 10.0 | 5.0 | 80 | 1.65 | 0.90 | 2.55 |
| 10.0 | 10.0 | 80 | 1.67 | 1.20 | 2.87 |
| 10.0 | 20.0 | 80 | 1.43 | 1.46 | 2.59 |
| 10.0 | 50.0 | 80 | 2.48 | 2.20 | 4.68 |
| 10.0 | ¹ 0.5 | 20 | 3.07 | 3.75 | 6.82 |
| 10.0 | ¹ 2.5 | 20 | | 2.84 | |
| 10.0 | ¹ 10.0 | 20 | 1.28 | 2.72 | 3.99 |
| 10.0 | ¹ 50.0 | 20 | 2.10 | 2.33 | 4.43 |
| 10.0 | ¹ 0.5 | 80 | 2.18 | 1.61 | 3.79 |
| 10.0 | ¹ 2.5 | 80 | 0.21 | 3.54 | 3.75 |
| 10.0 | ¹ 10.0 | 80 | 0.12 | 5.94 | 6.06 |
| 10.0 | ¹ 50.0 | 80 | 0.77 | 14.8 | 15.6 |
| 10.0 | ² 8.35 | 20 | 3.07 | 15.5 | 18.6 |
| 10.0 | ² 8.35 | 80 | 1.31 | 15.5 | 16.8 |
| 10.0 | ³ 9.29 | 20 | 1.85 | 26.2 | 28.2 |

¹ Ammonium salt.
² Sodium salt.
³ Potassium salt.

NOTE.—The total $P_2O_5$ of the aluminum phosphate sample was 58.0%.

Further, as to the results obtained for the ammonium, sodium and potassium salts of nitrohumic acids in the above Examples 1 and 2, these values were obtained by maintaining the pH value for the mixtures containing these salts at the same value as that when nitrohumic acids were used.

Also, when ferric phosphate was used and measurements were made as in the above Examples 1 and 2, results similar to that of the aforesaid Table II were obtained.

EXAMPLE 3

This example shows that nitrohumic acids effect a relatively weak chemical bond with water soluble phosphates. An aqueous solution of hydro-disodium phosphate $$(Na_2HPO_4 \cdot 12H_2O)$$

and an organic acid to change the pH value of the aqueous solution were added to nitro-humic caids. After shaking for a given period of time and filtering out, the amount of phosphoric acid absorbed by the nitro-humic acids was measured. The condition of the reactions and the results thereof were as shown in Table III, below.

TABLE III

| Experiment No. | Nitro-humic acids (g.) | Hydro-disodium phosphate (g.) | Water (g.) | Organic acid added (g.) | Time shaken (min.) | Amount $P_2O_5$ absorbed (wt. in percent of nitro-humic acids) |
|---|---|---|---|---|---|---|
| 1 | 10 | 10 | 100 | None | 30 | 12.2 |
| 2 | 10 | 10 | 100 | None | 60 | 13.2 |
| 3 | 10 | 10 | 100 | Tartaric acid 2 g. | 30 | 11.1 |
| 4 | 1 | 1 | 100 | None | 30 | 3.7 |
| 5 | 1 | 1 | 100 | Tartaric acid 1 g. | 50 | 0.7 |
| 6 | (¹) | None | 100 | Tartaric acid 5 g. | 60 | 4.2 |

¹ No. 2 Reactant 10.

From Table III it is apparent that nitro-humic acids very readily unite with water soluble phosphates, this tendency being more conspicuous the higher the phosphate concentration. Moreover, it can also be seen that the bond between nitro-humic acids and water soluble phosphates being relatively weak, this bond is readily broken by the addition of a small amount of tartaric acid or acetic acid, which are much weaker than citric acid, and thus that the phosphoric acid absorbed is returned to the aqueous solution.

EXAMPLE 4

Hardness of Granular Fertilizers

What becomes the problem in hauling granular fertilizer whose grain diameter is several millimeters is the formation of fine powders as a result of the outer surfaces of the grains being rubbed by mutual friction between the grains. It can be said that when the resistance with respect to this friction, i.e., the frictional strength is great, powderization during hauling becomes relatively hard of occurring, while if the frictional strength is small, powderization easily occurs.

A. *Method of measuring the frictional strength.*—5 g. of granular fertilizer of 6–9 mesh were placed in a steel pipe, 25 mm. in diameter and 350 mm. in length, having a smooth interior surface, and rotated 500 times at a speed of 25 r.p.m. The weight percentage of those granular fertilizer of more than 9 mesh size was adopted as the measurement of the frictional strength.

B. *Preparation of the samples.*—The samples were prepared as follows: Two or three compounds from the group consisting of calcium superphosphate, powdered rock phosphate, nitro-humic acids, and ammonium nitro-humate were mixed together. A suitable amount of water was added to each of the mixtures, which were then stirred and kneaded in a small quantity granular fertilizer manufacturing machine for 30–40 minutes. The water content of each of the starting materials was made to be the proportion as reduced when dried for one hour at 105–110° C.

Water content of starting material: Weight percent
Calcium superphosphate (Nissan Chemical Co.) _____ 9.35
Powdered rock phosphate _____ 1.10
Nitro-humic acids _____ 11.1
Ammonium nitro-humate _____ 8.23

C. *Frictional strength of granular fertilizer.*—The following Tables IV and V show the frictional strengths of the samples three days after preparation. The item "Water added" in the table is the water added at the time of preparation of the samples, the water content being the reduced percentage at the time when measurement was made of the frictional strength after drying for one hour at 105–110° C. The proportions of the mixtures are those of the other components to 100 parts of calcium superphosphate or powdered rock phosphate after having been dried as above.

TABLE IV.—FRICTIONAL STRENGTH OF GRANULAR CALCIUM PHOSPHATE

| Sample No. | Calcium superphosphate | Nitro-humic acids | Ammonium nitro-humate | Water added | Water content (percent) | Frictional strength (percent) |
|---|---|---|---|---|---|---|
| 1 | 100 | 30 | ---------- | 10.0 | 5.8 | 98 |
| 2 | 100 | 70 | ---------- | 17.5 | 7.9 | 98 |
| 3 | 100 | 100 | ---------- | 28.5 | 9.0 | 97 |
| 4 | 100 | 5 | 5 | 8.7 | 6.1 | 96 |
| 5 | 100 | 15 | 15 | 6.7 | 7.6 | 98 |
| 6 | 100 | 35 | 35 | 25.0 | 7.5 | 98 |
| 7 | 100 | 25 | 5 | 12.7 | 8.8 | 97 |

TABLE V

| Sample No. | Powdered rock phosphate | Nitro-humic acids | Ammonium nitro-humate | Water added | Water content (percent) | Frictional strength (percent) |
|---|---|---|---|---|---|---|
| 1 | 100 | 20 | ---------- | 32.3 | 10 | 88 |
| 2 | 100 | 40 | ---------- | 32.7 | 11 | 85 |
| 3 | 100 | 50 | ---------- | 44.3 | 13.4 | 89 |
| 4 | 100 | 12 | 8 | 25.1 | 10 | 84 |
| 5 | 100 | 24 | 16 | 37.7 | 9 | 77 |
| 6 | 100 | 30 | 20 | 44.5 | 10.5 | 86 |
| 7 | 100 | 36 | 24 | 50.3 | 10.4 | 82 |
| 8 | 100 | 40 | 10 | 50.0 | 8.2 | 88 |

EXAMPLE 5

Cylindrical-shaped solid fertilizers were produced using as the molding machine that which was capable of being used within the range of 0–500 kg./cm.$^2$ and as the raw materials powdered Florida rock phosphate, nitro-humic acids, and ammonium nitro-humate which were respectively mixed in the proportions as shown in Table VI, below. To this mixture water in a suitable amount was added, and then 7–8 g. of this mixture were taken and manufactured into a cylindrical-shaped solid fertilizer having a diameter of 2 cm. and a height of 1.3–1.7 cm. using molding pressures of respectively 225 kg./cm.$^2$, 338 kg./cm.$^2$, and 450 kg./cm.$^2$. This solid fertilizer which was then air-dried for several days was dropped on a steel plate from a height of 3 m., but since none broke, their breakage strength was measured.

TABLE VI

| No. | Proportion of mixture | | | Water (percent) | Molding pressure (kg./cm.$^2$) | Breakage strength 3 days later (kg./cm.$^2$) |
|---|---|---|---|---|---|---|
| | Powdered rock phosphate (g.) | Nitro-humic acids (g.) | Ammonium nitro-humate (g.) | | | |
| 1 | 100 | 70 | 30 | 15.9 | 225 | 20 |
| 2 | 100 | 70 | 30 | 15.9 | 340 | 45 |
| 3 | 100 | 70 | 30 | 15.9 | 450 | 55 |
| 4 | 100 | 30 | 20 | 17.4 | 225 | 30 |
| 5 | 100 | 30 | 20 | 17.4 | 340 | 45 |
| 6 | 100 | 30 | 20 | 17.4 | 450 | 65 |
| 7 | 100 | 0 | 50 | 16.8 | 225 | 50 |
| 8 | 100 | 0 | 50 | 16.8 | 340 | 55 |
| 9 | 100 | 0 | 50 | 16.8 | 450 | 60 |
| 10 | 100 | 70 | 30 | 21.2 | 340 | 50 |
| 11 | 100 | 30 | 20 | 19.4 | 340 | 50 |
| 12 | 100 | 0 | 50 | 25.5 | 340 | 50 |
| A | 0 | 100 | 0 | 16.2 | 225 | 2 |

NOTE.—No. A was performed as a blank test for reference.

Fused phosphate fertilizers, burnt phosphate fertilizers, and calcium superphosphate were also molded substantially in the same manner.

EXAMPLE 6

A fertilizer granulated by kneading calcium superphosphate, fused phosphate fertilizer, burnt phosphate fertilizer, and powdered Gafsa rock phosphate respectively with nitro-humic acids was used, and a growth test of barley was conducted in 1/50,000 plots. The results were as shown in Table VII, below.

TABLE VII

| Type of phosphate fertilizer | Weight of head (g.) | Amount P₂O₅ absorbed (mg.) | Apparent P₂O₅ absorption rate (percent) |
|---|---|---|---|
| Non-phosphate | 0.72 | 1.88 | |
| Calcium superphosphate | 11.42 | 45.38 | 17.40 |
| Fused phosphate fertilizer | 6.34 | 30.64 | 11.51 |
| Burnt phosphate fertilizer | 9.59 | 40.57 | 15.48 |
| Powdered Gafsa rock phosphate | 2.83 | 8.67 | 2.72 |
| Granular calcium superphosphate | 21.49 | 78.71 | 30.91 |
| Granular fused phosphate fertilizer | 38.99 | 143.36 | 56.79 |
| Granular burnt phosphate fertilizer | 28.02 | 84.60 | 37.26 |
| Granular powdered Gafsa rock phosphate | 31.22 | 108.31 | 42.75 |

NOTE.—Nitrogenous and potassic fertilizers were applied in equal amounts, and except for the non-phosphate plot, phosphate fertilizers were applied in amounts so that the amount of P₂O₅ would become equivalent.

Since it is apparent that many changes and modifications can be made in the above-described details without departing from the nature and spirit of the invention, it is to be understood that the invention is not to be limited thereto except as set forth in the appended claims.

What is claimed is:

1. A rapid process for the manufacture of a soluble granulated phosphate fertilizer and preventing the reversion thereof when added to the soil comprising the steps of admixing, in the presence of a small amount of water, nitro-humic acid having the formula $$C_{49}H_{44}O_{10}(-COOH)_5(-OH)_6$$
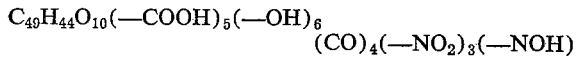

and the alkali salts thereof with an inorganic phosphate insoluble in water and citric acid, said nitro-humic acid and the alkali salts thereof being introduced in an amount sufficient to solubilize the phosphate, thereafter recovering a granulated soluble phosphate fertilizer.

2. A rapid process for the manufacture of a soluble granulated phosphate fertilizer in accordance with claim 1, wherein the alkali salts of the nitro-humic acid are selected from the group consisting of ammonium, potassium, and sodium salts of nitro-humic acid.

References Cited in the file of this patent

UNITED STATES PATENTS

| 838,108 | Hammerschlag | Dec. 11, 1906 |
| 1,309,723 | Earp-Thomas | July 15, 1919 |
| 1,434,749 | Plauson | Nov. 7, 1922 |
| 1,530,397 | Oden et al. | Mar. 17, 1925 |
| 1,606,015 | Blackwell | Nov. 9, 1926 |

FOREIGN PATENTS

| 361,890 | Great Britain | Nov. 23, 1931 |
| 424,260 | Great Britain | Feb. 18, 1935 |

OTHER REFERENCES

Inukai: "Chemical Abstracts," vol. 50, No. 22, November 25, 1956, page 17383.

Higuchi et al.: "Chemical Abstracts," vol. 50, No. 22, November 25, 1956, page 17383.

Higuchi et al.: "Chemical Abstracts," vol. 51, No. 13, July 10, 1957, page 10029.